F. F. SMITH.
Couplings for Sulky and other Plows.
No. 230,902.  Patented Aug. 10, 1880.
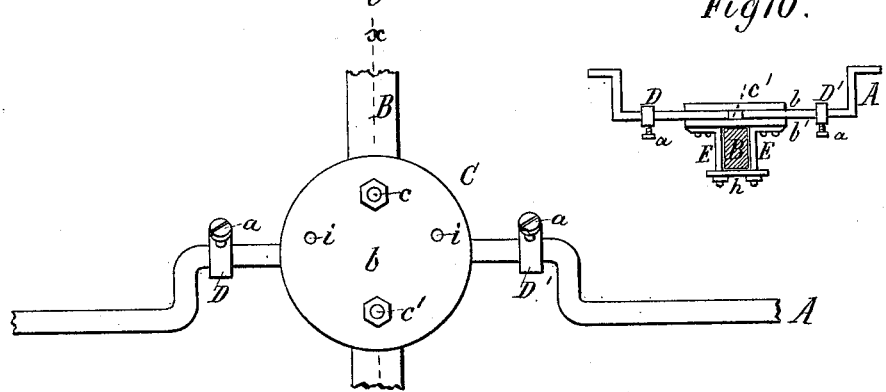
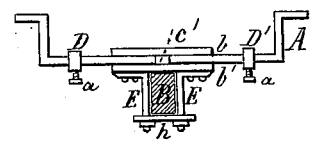
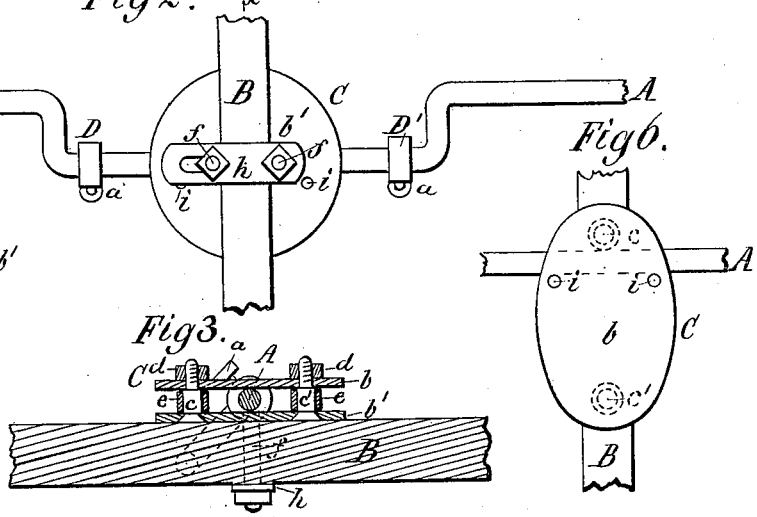
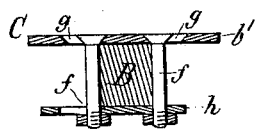
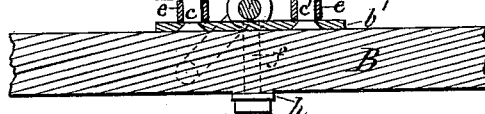
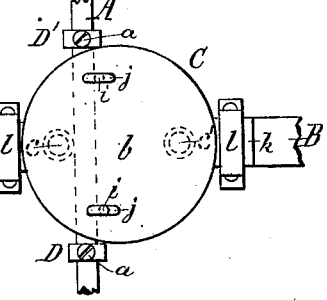
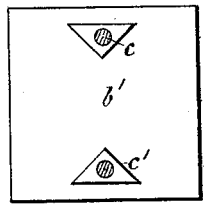
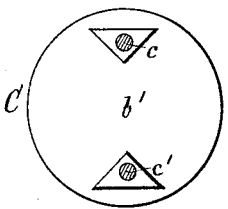
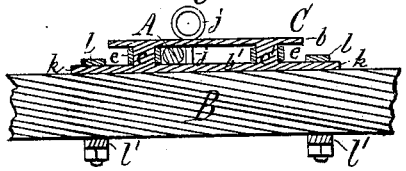
Witnesses:  Inventor:
J. P. Th. Lang.  Francis F. Smith
J. Russell Bart  by Mason Fenwick & Lawrence
  Attorneys

UNITED STATES PATENT OFFICE.

FRANCIS F. SMITH, OF AURORA, ILLINOIS, ASSIGNOR OF ONE-HALF OF HIS RIGHT TO JOHN W. LOCKWOOD, OF PORTAGE TOWNSHIP, OTTAWA COUNTY, OHIO.

COUPLING FOR SULKY AND OTHER PLOWS.

SPECIFICATION forming part of Letters Patent No. 230,902, dated August 10, 1880.

Application filed January 28, 1880.

*To all whom it may concern:*

Be it known that I, FRANCIS F. SMITH, of Aurora, in the county of Kane and State of Illinois, have invented a new and Improved Coupling for Sulky and other Plows; and I do hereby declare that the following is a full, clear, and exact description of the same, reference being had to the accompanying drawings, forming part of this specification, in which—

Figure 1 is a top view of a sulky-axle, shaft, or bail, and a part of a plow-beam and my improved coupling. Fig. 2 is a bottom or inverted plan view of the same. Fig. 3 is a vertical section of the same in the line of the center of the plow-beam. Figs. 4, 5, 6, 7, and 8 are modifications of the invention. Fig. 9 is a vertical section of the lower plate of Fig. 3. Fig. 10 is a modification of Fig. 9.

The object of my invention is to effect the coupling of the plow to the shaft or axle of a sulky in such a manner that the plow and sulky shall move over a field together, and either the sulky or the plow be free to move independently of each other in a direction longitudinal with the axle of the sulky, or a direction longitudinal of the plow-beam, and in a direction in the path of a horizontal circle concentric with the center of motion of either the plow or sulky, and at the same time the plow shall be prevented from tilting over sidewise either to the right or left, and yet be free to swing around the axle of the sulky in an upward and downward direction.

Another object of my invention is to provide a coupling which will permit the axle of the sulky or other wheeled carriage to which a plow is attached to move in the various directions above mentioned independently of the plow, and which is adapted to be confined to the axle and plow-beam by collars and stop-pins in such a manner that the independent movements of the plow and of the sulky shall be limited to the swinging movements around the axle in an upward and downward direction.

Another object of my invention is to provide means for adjusting the plow upon the axle of the sulky or other wheeled carriage so that it shall take more or less land, and at the same time have the plow and sulky coupled together by the improved coupling, which permits the independent movements of the sulky and plow.

Where riding-plows have been contrived with a view of having the carriage move laterally independently of the plow proper, the bearing-points or pivots of motion of the plow-beam have been placed apart laterally and at each side of the line of draft, and owing to this the carriage necessarily makes a motion eccentric to a vertical center intersecting the said line of draft, and there is great strain and often binding of the parts. With my plow-coupling there is but a single pivotal bearing-point, and this is in a line with the draft, and consequently the plow-carriage can swing around horizontally without any liability of binding, and it can also slide back and forth laterally and longitudinally, and the plow can vibrate in a vertical plane upon the crank or other shaft which carries and adjusts it.

In the accompanying drawings, A represents an axle of any description of sulky or carriage plow; B, a plow-beam of any description of plow or plows, and C the improved coupling for connecting the plow with the axle. D D' are adjustable collars placed on each side of the coupling and provided with set-screws *a*, by which they are held in place.

The coupling may consist of two round plates, *b b'*, connected together by shouldered posts or collared bolts *c c'*, the upper ends of which are screw-threaded and furnished with nuts *d d*. Around the posts friction-rings *e* may be fitted. On the bottom plate, *b'*, clip-bolts *f f* may be applied by passing them down through the plate and having their heads fit countersinks in the upper side of said plate, as shown in Fig. 9. These clip-bolts, one or both, may be fitted in oblong holes *g*, so as to be moved nearer together or farther apart. On the lower ends of the bolts *f f* screw-threads are cut and nuts screwed thereon. The two bolts are coupled together by a clip-plate, *h*, previous to the screwing on of the nuts, said clip-plates being provided with one or more oblong slots at the points where the bolts pass through them, in order to permit the bolts to be set nearer together or farther apart, as the size of the plow-beam may require.

Fig. 10 shows another method of attaching the coupling to the plow-beam by the use of two flat bars, E E, bent at right angles, bolted or riveted to the plate *b'*, with their bottom ends rounded and screw-threaded, over which the yoke h is passed and nutted at the bottom. The plates b b' are perforated at i i, just a little forward of the rear post, c, and some distance from each side of said post, and stop-pins j are provided for insertion into these holes, as occasion may require.

The coupling thus constructed is slipped upon the axle and connected to the plow-beam in the manner represented, and then the collars D D' are set some distance away from the periphery of the plates and screwed in position. The collar D may be used for determining the width of the furrow-slice to be taken by the plow, while the two collars together prevent a too great lateral vibration of the carriage-axle and of the plow, in the event of its point being deflected by a heavy obstruction. They also answer as stops to confine the coupling when necessary.

It will be seen from the drawings that the holes i i are just forward of the carriage axle, shaft, or bail when this axle is bearing against the post c, and that when the pins j j are inserted in these holes the axle will be confined against forward and horizontal movements.

It will also be seen that if the collars D D' are moved up against the periphery of the plates of the coupling they will confine the axle and the coupling from independent sidewise movement. The pins and collars thus adjusted will adapt the plow for plowing the last or dead furrow, while plowing which the axle and plow will have freedom to swing up and down independently of each other.

In carrying out my invention I shall adopt either the round plates shown in Figs. 1, 2, 3, 8, and 9, the square plates, Fig. 7, or the elliptical plates, Fig. 6, as circumstances may require, and in connection with either of said plates, either round or triangular, oval, or square posts may be adopted, as found most advantageous.

Instead of making the coupling of two plates united by separate posts, it may be made of a single piece, as shown in Figs. 4 and 5; and when thus constructed it will be provided with outside flanges, k k, and around these and the plow-beam clips l l', for fastening the coupling to the plow-beam, may be employed.

One great advantage secured by my invention is this: When the point of the plow strikes a formidable obstruction the coupling, with the plow and its beam, can move laterally on the axle, and thus the sulky or carriage will not be strained to any great extent, if at all; and this being so, the carriage-wheels may be made of uncommon light weight and answer for the purpose of supporting the plow or plows. This advantage, in connection with the others mentioned in the statement of the object of invention in this specification, will render my invention of great utility when employed on any description of single or double plow supported by any of the wheeled carriages commonly used.

The operation is as follows: The team is preferably hitched to the free or front end of the plow-beam, and the plow is drawn in a straight line, and during its movement the carriage or sulky accommodates itself to the unevenness of the ground by sliding its axle either laterally, longitudinally, or horizontally in the coupling. If there is no necessity for movements of the axle in the coupling, it (the axle) will bear against the rear post of the coupling the same as though it were a fixed coupling-pin connection. The forward post of the coupling performs no special office further than to keep the plow from entirely separating from the carriage-axle.

The results attained by my invention are, first, positive liberation of the plow-beam from any and all landside-pressure over and above that inherent in the same plow when used without a wheeled supporting-carriage; second, a positive liberation of the plow-carriage from any and all sidewise strain of guiding-pole, shaft, or wheels when turning to right or left with the plow deep in the soil at its work; third, no side leverage can be exerted to interfere with the draft-lines; fourth, the plow is free to dip into or rise out of the soil; fifth, if either right or left, top or bottom, of the coupling is pressed steadily against the shaft or axle, it is a sure indication that the plow is not in balance, and that the share has too much or too little dip; sixth, from its self-adjusting character the commonest operator can properly attach an ordinary plow to a wheeled frame that has this coupling; seventh, it is adapted for application to the various kinds of wheeled plow-frames, whether simple or complex, and provided or not with the various leveling and adjusting devices common to wheeled sulky-plows.

The coupling C may be made of either wrought or cast metal, or any suitable material, and may be attached by bolting, clipping, or screwing.

What I claim is—

1. The coupling C, composed of the two plates b b', united together, as described, and having the rear central bearing at c and a front stop at c', whereby the shaft or axle is coupled to the plow and yet allowed free lateral and longitudinal motion and the plow-beam and coupling are allowed free vertical oscillation, while tilting of the shaft or axle and plow independently of each other is prevented, substantially as set forth.

2. The coupling C, composed of the plates b b', united together, as described, and having the rear central bearing, c, and a front stop, c', in combination with the axle or shaft A, collars D D', and plow-beam B, substantially as shown and set forth.

3. The combination of the coupling device C, axle A of a sulky or carriage, a plow-beam, B, stop-pin holes i i, stop-pins j j, and adjustable collars D D', substantially as described.

FRANCIS F. SMITH.

Witnesses:
J. W. LOCKWOOD,
EDWARD NORTHANS.